United States Patent Office 3,574,826
Patented Apr. 13, 1971

3,574,826
HYDROPHILIC POLYMERS HAVING VITAMINS ABSORBED THEREIN
Thomas H. Shepherd and Francis E. Gould, Princeton, N.J., assignors to National Patent Development Corporation, New York, N.Y.
No Drawing. Continuation-in-part of applications Ser. No. 567,856, July 26, 1966, Ser. No. 650,259, June 30, 1967, and Ser. No. 654,044, July 5, 1967. This application Feb. 27, 1968, Ser. No. 708,517
Int. Cl. A61k 15/00
U.S. Cl. 424—81
11 Claims

ABSTRACT OF THE DISCLOSURE

A hydrophilic cross-linked polymeric composition having vitamins absorbed therein.

The hydrophilic cross-linked polymer is prepared by admixing in the solvent-free state a major amount of a water-soluble polymerizable monester of an olefinic acid having at least one substituted hydrophilic functional group with a minor amount of a free radical, vinyl polymerization catalyst in an anaerobic atmosphere and heating from ambient temperatures to about 80° C. until the said monomer is water-insoluble, cooling said resulting mixture to ambient temperature and adding a minor amount of a polymerizable diester of one of said olefinic acids having at least two esterifiable hydroxy groups along with an additional minor amount of one of said catalysts sufficient to form a liquid casting syrup adapted to be polymerized in situ. Powders which may be produced from the resulting product are mixed with selected vitamins which can be reconstituted in solution at will. Also, because of the compact form of the vitamin carrying powders encapsulation may be performed to prevent deterioration of the vitamin component.

CROSS-REFERENCE TO RELATED APPLICATIONS

This is a continuation-in-part application of Ser. No. 567,856, filed July 26, 1966 and now U.S. Patent No. 3,520,949 and Ser. No. 654,044, filed July 5, 1967, application Ser. No. 650,259, filed June 30, 1967 now abandoned.

BACKGROUND OF THE INVENTION

This invention relates to novel hydrophilic polymers particularly adapted as carriers for vitamins which may be assimilated into animal organisms.

It is known to produce hydrophilic polymers, more particularly to produce cross-linked hydrophilic polymers in an aqueous solution by copolymerizing in an aqueous solution a major portion of a monoester derived from the reaction of acrylic or methacrylic acid with a bi-functional alcohol having an esterifiable hydroxyl group and at least one additional hydrophilic functional group, with a small amount of a diester produced by the reaction of acrylic or methacrylic acid with an alcohol which has at least two esterifiable hydroxyl groups.

It is known that hydrophilic polymers prepared in an aqueous system are carriers for various organic substances including medicinal substances. Thus, it is known that medicinally-active substances may be dissolved in the aqueous constituent of such polymers to provide gradual release of the medicinally-active substances; however, the resulting solutions are difficult to handle and store and the organic substances are susceptible to air oxidation, degradation, deterioration, evaporation etc.

Heretofore, it has been necessary to prepared a solid or shaped body of the hydrophilic polymer and thereafter dissolve in the aqueous constituents of such shaped body the medicinal flavor, sweeteners, coloring agent and the like. Additionally, in the prior art preparation, employing copolymerization in an aqueous solution, it has not been possible to directly prepare a foam by the addition of the usual foaming agents, such as sodium bicarbonate, for the reason that a soft semi-gelatinous hydrogel product resulted rather than the desired hard friable foam and it was not possible to convert such semi-gelatinous product to a friable foam or to a compactable powder.

In addition, the said prior art process employing the conventional redox catalyst such as sodium bicarbonate and ammonium persulfate, potassium persulfate, sodium thiosulfate and ammonium persulfate or potassium persulfate, caused the polymerization reaction to go to completion at temperatures above 0° C. thereby preventing the preparation of a prepolymer preferably in the form of a liquid casting syrup which is capable of developing into a hard, friable foam as will be hereinafter further described.

SUMMARY

It now has been found that hydrophilic polymers can be prepared in a water-free system so as to permit the direct preparation of liquid casting syrups in a prepolymer form which can be treated with conventional foaming agents such as sodium bicarbonate to result, after curing, in hard, friable foams which can be directly formed into the swelled state or ground directly to powder form.

It also has been found that hydrophilic polymers can be prepared in a water-free system so as to permit ready preparation of the hydrophilic polymer products in powered form. An object of the present invention is to prepare said hydrophilic polymers in a water-free system to permit their direct conversion to a powdered form whereby the powdered polymers are especially adapted as carriers for vitamins. The polymeric powders of the present invention have been found to be compact in form and have been found to provide the necessary stability and shelf life to enable their use as carriers for vitamins which are susceptible to chemical reactions such as air oxidation, deterioration, evaporation, and degradation.

A further advantage derived from the compactness ability of the instant powdered hydrophilic polymers is that upon encapsulation of the said vitamin carrying powder, greater stability and longer shelf life are provided than was heretofore possible.

Polymeric powders containing vitamins, particularly water and alcohol soluble vitamins, can be reconstituted in solution at will, thus providing superior vitamin solutions in view of the fact that their prior encapsulation prevents air deterioration of the vitamin component.

These and other advantages of the present invention are realized in a hydrophilic cross-linked polymeric composition having vitamins absorbed therein.

The hydrophilic cross-linked polymer is prepared by admixing in the solvent-free state a major amount of a water-soluble polymerizable monoester of an olefinic acid having at least one substituted hydrophilic functional group with a minor amount of a free radical, vinyl polymerization catalyst in an anaerobic atmosphere and heating from ambient temperatures to about 80° C. until the said monomer is water-insoluble, cooling said resulting mixture to ambient temperature and adding a minor amount of a polymerizable diester of on of said olefinic acids having at least two esterifiable hydroxy groups along with an additional minor amount of one of said catalysts sufficient to form a liquid casting syrup adapted to be polymerized in situ.

DETAILED DESCRIPTION OF THE PREFERRED EMBODIMENTS

The liquid casting syrups of this invention are prepared by mixing a major amount of suitably purified commercial polymerizable monoester of an olefinic acid containing at least one substituted hydrophilic functional group with a minor concentration of a free-radical catalyst and heating from ambient temperature to 80° C. until the monomer no longer shows water solubility. This product is then cooled to room temperature and addition of theoretical catalyst content carried out. The fluid viscosity of the casting syrup can then be increased as desired by addition of appropriate thickening agents.

The casting syrup can then be cured to form products capable of existing in a rigid state, swelled state or as a foam. The polymer obtained from the cured casting liquids has good reversible fluid absorption properties and the ability to retain its shape in a fluid media.

Starting materials which may be utilized in accordance with the present invention are hydroxy alkyl esters of an alpha beta unsaturated carboxylic acid such as 2-hydroxy ethyl methacrylate, hydroxy propyl methacrylate and the like. These are admixed in a water-free system with appropriate quantities of a free radical catalyst such as tertiary butyl peroctoate, isopropyl percarbonate, benzoyl peroxide, and the like and a suitable cross-linking monomer such as ethylene glycol dimethacrylate, 1,3-butylene dimethacrylate, 1,4-butylene dimethacrylate or other polyfunctional monomeric esters.

Free radical catalyst concentrations in the range of 0.05 g. to 0.3 g. catalyst per 100 g. of polymerizable hydroxy alkyl ester have been found to be adequate with the preferred quantity being between 0.1 and 0.2 g. per 100 g. starting material.

The ability of the polymer of this invention to retain water as a homogeneous constituent is strongly influenced by the proportion of polyfunctional cross-linking agent present. For the polymer of this invention, concentrations of 0.05 to 10 g./100 g. of 2-hydroxy ethyl methacrylate have been found convenient, the preferred range being 0.1 to 0.2 g. cross-linking agent per 100 g. of polymerizable hydroxy alkyl ester.

Polymerization of the above reactants may be accelerated by the application of heat or, by selecting the catalyst and the amount thereof, the application of heat may be omitted and rapid polymerization induced at ambient temperatures. In instances where heat is applied for curing, temperatures ranging from about 20° C. to about 80° C. have been found to be convenient with 40 to 70° C. being the preferred range.

Prior to the addition of the vitamin component the liquid casting syrups may be added to an excess quantity of water to form a precipitated polymer. The latter is soluble in highly polar organic solvents such as alcohols, glycols and glycol ethers. The precipitated polymer is dried and mixed with selected vitamins to provide an excellent carrier therefor.

In a further embodiment of the invention, hydrophilic soluble thermoplastic polymers are prepared by suspension polymerization of hydroxy ethyl methacrylate in a non-polar medium such as silicon oil or mineral oil. The monomer containing catalyst is dispersed in the non-polymer medium in the form of small droplets which polymerize to form finely divided spheres or beads.

The polymers resulting from the above-noted embodiments prepared in the form of films or rods, may be ground into fine powders. By admixing foaming agents such as sodium bicarbonate with the reactants prior to curing, the polymer may be obtained in the form of a foam which is easily disintegrated into a fine powder by means of a shearing action. The polymeric powders of this invention are preferably obtained from foams. Quantities of 1 to 4 grams foaming agent per 100 grams of reactants have been found to be sufficient. Other foaming agents which may be used include for example, azo bis (formamide), diazoaminobenzene, N,N' - dinitrosoterephthalamide, p,p'-oxy-bis (benzene sulfonyl semicarbazide), azo bis (isobutyronitrile), p,p'oxy-bis (benzene sulfonyl hydrazide), p,p'-diphenyl-bis (sulfonyl hydrazide), benzene-sulfonyl hydrazide, m-benzene-bis (sulfonyl hydrazide) etc.

Polymeric powders prepared by any of the above means are mixed with natural or synthetic vitamins dissolved in an appropriate solvent and the mixture placed on a mechanical roller so that the solution becomes intimately mixed. The solution is then filtered and dried by air evaporation or forced heat. Upon evaporation of the solvent the vitamin is retained by the powder. Due to its extreme hydrophilicity and because the hydrophilic polymer of this invention has reversible fluid adsorption properties, the powders can be reconstituted in solution at will to provide solutions which provide concentrated vitamin factors. Any of the known vitamins which are susceptible to assimilation in an animal organism including, of course, a human organism, may be utilized according to this invention. Illustrative examples of the vitamins which may be used in this invention include the water soluble vitamins such as vitamin $B_2$ complex including thiamine, riboflavin, nicotinic acid, pantothenic acid, puridoxine, biotin, inositol, para-amino-benzoic acid, choline, folic acid and cyanocobalamin; vitamin C (ascorbic acid) and vitamins $K_5$, $K_6$, and $K_7$; alcohol soluble vitamins such as vitamin A (retinol), dehydroretinal, retinene, vitamins $D_2$ and $D_3$, vitamins E and $K_1$ (2 methyl-3-phytyl 1-4 naphthoquinone), as well as fat soluble vitamins such as vitamins D, E and K. Emphasis in this disclosure has been placed on vitamins carrying polymeric powders which are generally administered orally. However, it should be emphasized that the hydrophilic cross-linked polymeric compositions produced according to this invention may be utilized in forms other than a powder when the need so dictates. For example, in some cases assimilation of vitamins into the body may be more advantageously realized by sub-cutaneous implants of a vitamin releasing material. In such instances, vitamins may be absorbed into solid or shaped forms of the presently disclosed polymeric compositions and thereafter positioned in the body in any conventional manner.

In the absence of indications to the contrary all proportions and concentrations of materials are expressed on a weight basis.

The following examples will further illustrate the invention.

Example 1

100 g. 2-hydroxy ethyl methacrylate is stirred with 0.1 g. tertiary butyl peroctoate in an inert atmosphere and 0.15 g. ethylene glycol dimethacrylate is added. Before casting at 49° C. for 30 minutes, nutrient media is added to make up 50% weight of the polymer solution. The dry plate can be stored and thereafter immersed in water to release nutrient media.

Example 2

Into a flask equipped with an agitator and a heating mantle was charged 1000 grams of silicone oil; 100 grams of 2-hydroxy ethyl methacrylate and 0.33 gram of isopropyl percarbonate. The flask was placed under a nitrogen atmosphere and the contents were rapidly agitated and heated to 100° C. After 15 minutes at 100° C., the polymer slurry obtained was filtered hot to isolate the polymer. The polymer was reslurried in 30 ml. of xylene, filtered and dried. A 98% yield of $2\mu$ to $5\mu$ particle size powder was obtained.

30 g. of the produced powder was dissolved in 70 ml. of methanol. To the solution 4.0 g. of expressed orange oil was added. Powders were obtained to provide for controlled release of the orange oil upon and during wetting of the powder with water.

Example 3

Purified 2-hydroxyethyl methacrylate (500 g.) was mixed with 1.5 g. of ethylene dimethacrylate and 0.5 g. of diisopropyl percarbonate. The solution was poured into an aluminum pan to form a layer ½ inch thick. The pan was placed in an oven at 60° C. under a carbon dioxide atmosphere for 2 hours to polymerize the liquid layer. The solid sheet thus obtained was ground to −80 mesh powder in a hammer mill. The powder was leached with water for 6 hours and was then dried in a vacuum oven to constant weight. 480 grams of powder was obtained.

To 10 g. of the powder was added 10.0 g. of a 5% solution of vitamin $B_{12}$ (cyanocobalamin) in absolute methanol. The powder absorbed the solution to form a soft gelatinous mass. The methanol was removed by vacuum drying at 45° C. to yield a powder containing cyanocobalamin homogeneously distributed therein. The vitamin thus absorbed is protected from oxidative degradation by the polymer matrix but is eluted from the powder by placing the powder in contact with water.

Example 4

To 10 g. of the powder of Example 3 was added 5 cc. of a saturated aqueous solution (.075 g. per cc.) of riboflavin phosphate. The slurry was allowed to stand at 5° C. for 20 hours whereupon the powder had absorbed the liquid to form soft granules. The granules were then dried in a vacuum oven at 50° C. to yield a powder containing 37 mg./g. of riboflavin phosphate homogeneously absorbed therein. On placing the powder in water, riboflavin phosphate is eluted from the powder.

Example 5

To 10 grams of the powder of Example 3 was added 5 ml. of a 20% aqueous solution of ascorbic acid. The slurry was allowed to stand overnight under a $CO_2$ atmosphere to allow the powder to absorb the solution. The soft powder was then dried in a vacuum oven at 45° C. to yield 11 grams of powder containing 9% ascorbic acid homogeneously distributed therein. The polymer matrix when dry protected the acid from oxidative degradation. The acid was readily eluted from the powder on contact with water.

Example 6

Example 5 was repeated using nicotinamide in place of ascorbic acid. On contact with water the powder containing the nicotinamide, provided a controlled release rate of nicotinamide into the aqueous solution.

Example 7

To 10 grams of 2-hydroxyethyl methacrylate was added 0.2 g. of ethylene dimethacrylate and 0.5 g. of calciferol (vitamin D). To the resulting solution was added 0.2 g. of diisopropyl percarbonate and the solution was heated in a test tube at 60° C. under a nitrogen atmosphere for 2 hours to effect polymerization. The resulting polymer plug was removed from the tube and ground to −80 mesh in a hammer mill. The calciferol was thereby protected from degradation in storage and could be eluted at a controlled rate from the powder by contact with water and suitable organic solvents such as alcohol.

Example 8

A mixture of the following vitamins:

Vitamin A—5000 units  
Vitamin D—400 units  
Vitamin $B_1$—2 mg.  
Vitamin $B_2$—2.5 mg.  
Vitamin C—50 mg.  
Vitamin $B_6$—1 mg.  
Vitamin $B_{12}$—1 mg.  
Niacinamide—20 mg.  
Calcium-pantothenate—1 mg.

was dissolved in a mixture of 10 g. of 2-hydroxyethyl methacrylate, .03 g. of ethylene dimethacrylate and 3 g. of a 2% aqueous solution of potassium persulfate. The mixture polymerized on warming to 50° C. in 10 minutes. The resulting polymer was ground to −80 mesh to provide a powder capable of eluting the vitamins on contact with water and appropriate organic solvents, such as alcohol and which protected the vitamins from decomposition during storage.

Example 9

To 500 g. of methanol contained in a flask equipped with a stirrer, reflex condenser and inert gas inlet was added 200 g. of 2-hydroxy-ethyl methacrylate and 0.4 g. of t-butyl peroctoate. The solution was stirred and heated at 60° C. under a nitrogen atmosphere from 6 hours. The viscous solution thus obtained was poured with stirring into 5000 cc. of distilled water to precipitate the polymer. The polymer was leached in water overnight and redissolved in methanol without drying to provide a solution of the following composition:

|  | G. |
|---|---|
| Methanol | 400 |
| Water | 100 |
| Polymer | 100 |

To 80 g. of the above solution was added the vitamin mixture of Example 6. The solution was then spray dried to a powder capable of releasing the vitamins at a higher rate than the product of Example 8.

The principle, preferred embodiments and modes of operation of the present invention have been described in the foregoing specification. However, it should be understood that the invention which is intended to be protected herein may be practiced otherwise than as described without departing from the appended claims.

What is claimed is:

1. A dry, water insoluble hydrophilic polymeric powder having an otherwise unstable vitamin susceptible to air oxidation, deterioration, evaporation and degradation absorbed therein, said polymeric material being a polymer of a water soluble hydroxy lower alkyl ester of acrylic acid or methacrylic acid and providing necessary stability and shelf life for the vitamin.

2. A hydrophilic powder as defined in claim 1 wherein said monester is 2-hydroxy ethyl methacrylate and said diester is ethylene glycol dimethacrylate.

3. A hydrophilic powder as defined in claim 1 wherein said vitamin is cyanocobalamin.

4. A hydrophilic powder as defined in claim 1 wherein said vitamin is ascorbic acid.

5. A hydrophilic powder as defined in claim 1 wherein said vitamin is nicotinamide.

6. A hydrophilic powder as defined in claim 1 wherein said vitamin is calciferol.

7. A hydrophilic cross-linked polymeric material as defined in claim 1 wherein a mixture of water-soluble and alcohol soluble vitamins is absorbed in said hydrophilic material.

8. A hydrophilic powder according to claim 1 in which the polymer is soluble in highly polar organic solvents.

9. A hydrophilic material according to claim 1 in encapsulated powder form, said encapsulation providing greater stability and longer shelf life.

10. A hydrophilic powder according to claim 1 wherein the polymer is a copolymer of said hydroxy lower alkyl ester of acrylic acid or methacrylic acid with 0.05 to 10% of the weight thereof of a polymerizable diester of acrylic acid or methacrylic acid and a glycol having 2 to 4 carbon atoms.

11. A hydrophilic powder according to claim 1 wherein the vitamin is selected from the group consisting of thiamine, riboflavin, nicotinic acid, pantothenic acid, puridoxine, biotin, inositol, para-aminobenzoic acid, choline, folic acid, cyanocobalamin, ascorbic acid, vitamin $K_5$, vitamin $K_6$, vitamin $K_7$, vitamin $A_1$ dehydroretinal, retinene, vitamin $D_2$, vitamin $D_3$, vitamin E, vitamin $K_1$, vitamin D and vitamin K.

References Cited

UNITED STATES PATENTS

| 2,976,576 | 3/1961 | Wichterle et al. | 18—58 |
| 3,220,960 | 11/1965 | Wichterle et al. | 260—2.5 |
| 3,247,066 | 4/1966 | Milo Sovich | 424—19 |
| 3,269,903 | 8/1966 | Von Fieandt et al. | 424—81 |
| 3,328,256 | 6/1967 | Gaunt | 424—19 |
| 3,390,050 | 6/1968 | Speiser | 424—19 |
| 3,428,043 | 2/1969 | Shepherd | 128—268 |

SHEP K. ROSE, Primary Examiner

U.S. Cl. X.R.

252—316; 424—32, 33, 78, 201, 236, 237, 252, 255, 263, 266, 280, 284, 319, 344

Disclaimer 3,574,826.—*Thomas H. Shepherd*, and *Francis E. Gould*, Princeton, N.J. HYDROPHILIC POLYMERS HAVING VITAMINS ABSORBED THEREIN. Patent dated Apr. 13, 1971. Disclaimer filed Aug. 11, 1970, by the assignee, *National Patent Development Corporation*.

Hereby disclaims the portion of the term of the patent subsequent to Apr. 27, 1988.

[*Official Gazette March 21, 1972.*]